US010006590B2

(12) United States Patent
Koizumi

(10) Patent No.: US 10,006,590 B2
(45) Date of Patent: Jun. 26, 2018

(54) LED DEVICE AND LIGHTING FIXTURE

(71) Applicant: Stanley Electric Co., Ltd., Tokyo (JP)

(72) Inventor: Shinji Koizumi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 288 days.

(21) Appl. No.: 14/951,747

(22) Filed: Nov. 25, 2015

(65) Prior Publication Data

US 2016/0146431 A1 May 26, 2016

(30) Foreign Application Priority Data

Nov. 25, 2014 (JP) ................................ 2014-237627

(51) Int. Cl.

*F21V 7/08* (2006.01)
*B60Q 1/04* (2006.01)
*F21K 99/00* (2016.01)
*F21V 7/00* (2006.01)
*F21V 7/09* (2006.01)
*F21K 9/232* (2016.01)
*F21V 7/04* (2006.01)
*F21Y 115/10* (2016.01)

(52) U.S. Cl.

CPC .............. *F21K 9/135* (2013.01); *F21K 9/232* (2016.08); *F21V 7/0008* (2013.01); *F21V 7/09* (2013.01); *F21V 7/048* (2013.01); *F21Y 2115/10* (2016.08)

(58) Field of Classification Search

CPC .... F21V 7/0025; F21V 7/0033; F21V 7/0066; F21V 7/08; B60Q 1/04

See application file for complete search history.

(56) References Cited

U.S. PATENT DOCUMENTS 1,867,502 A * 7/1932 Edstrom .................. F21V 7/08 362/257
2,892,076 A * 6/1959 Moos ........................ F21V 7/08 362/247
3,745,325 A * 7/1973 Harvey ..................... F21V 7/08 359/359
4,755,916 A * 7/1988 Collins ................ B60Q 1/0058 362/236
5,412,543 A * 5/1995 Kobayashi ............... B60Q 1/12 362/284

(Continued)

FOREIGN PATENT DOCUMENTS

JP 4689762 B1 5/2011
JP 2011-146253 A 7/2011

*Primary Examiner* — Ismael Negron

(74) *Attorney, Agent, or Firm* — Kenealy Vaidya LLP

(57) ABSTRACT

An illuminating device includes an LED element, and a reflecting surface arranged in front of the LED. The reflecting surface includes a second reflecting surface formed in a substantially conical face shape with an apex at an intersection between an optical axis of the LED and the mirror reflecting surface and a conical side wall bulged inward, and a first reflecting surface formed as a concave reflecting surface recessed forward and having a first focal point disposed at or near the light emitting element and a second focal point disposed on the optical axis between the first focal point and the intersection. A housing including a plurality of reflective surfaces might also be included, with the illumination device positioned within.

10 Claims, 6 Drawing Sheets

(56) References Cited

U.S. PATENT DOCUMENTS

| | | | | | |
|---|---|---|---|---|---|
| 5,416,669 | A * | 5/1995 | Kato | B60Q 1/0011 | 362/23.15 |
| 5,574,328 | A * | 11/1996 | Okuchi | B60Q 1/0011 | 313/111 |
| 5,921,666 | A * | 7/1999 | Preston | F21S 8/02 | 362/225 |
| 6,540,387 | B2 * | 4/2003 | Hashiyama | B60Q 1/0052 | 362/247 |
| 6,891,333 | B2 * | 5/2005 | Tatsukawa | B60Q 1/04 | 315/82 |
| 6,951,416 | B2 * | 10/2005 | Sazuka | B60Q 1/04 | 362/507 |
| 9,007,237 | B2 * | 4/2015 | Jafrancesco | F21V 7/0033 | 340/945 |
| 9,085,373 | B2 * | 7/2015 | Hessling von Heimendahl | F21V 3/0436 | |
| 2013/0114253 | A1 | 5/2013 | Segawa et al. | | |

* cited by examiner

LED DEVICE AND LIGHTING FIXTURE

This application claims the priority benefit under 35 U.S.C. § 119 of Japanese Patent Application No. 2014-237627 filed on Nov. 25, 2014, which is hereby incorporated in its entirety by reference.

TECHNICAL FIELD

The presently disclosed subject matter relates to illuminating devices and lighting fixtures using the same. In particular, the presently disclosed subject matter relates to an illuminating device having an LED element as a light emission source and be capable of possessing the same light distribution characteristics as those of a common bulb having a coiled filament as a light emission source, and accordingly, of being used in place of such a bulb, and also to a lighting fixture utilizing such an illuminating device.

BACKGROUND ART

Examples of this type of conventional illumination device can include the “bulb-type lamp” disclosed in Japanese Patent Application Laid-Open No. 2011-146253 (or US2013/0114253A1 corresponding thereto), which is illustrated in FIG. 1.

That is, a polygonal support member 81 is attached to a tip of one end of a heat pipe 80, and a plurality of light emitting modules 83 are attached to the surface of the support member 81 (six faces of the peripheral side and one face of the top thereof) via a heat dissipation sheet. The light emitting modules 83 each can include a substrate 84 and a semiconductor light emitting element or LED element 85 mounted on the substrate 84. Then, a dome-shaped globe 86 having light diffusion properties is formed to cover the support member 81 and the light emitting modules 83, which together constitute a light emission body 87. It is said that the thus formed bulb-type lamp 88 can have light distribution characteristics similar to an incandescent bulb.

Japanese Patent No. 4689762 discloses an illumination device referred to as an “LED bulb” of this type, which can include an optical system as illustrated in (a) of FIG. 2.

The disclosed LED bulb can include an LED light emitting element 90 and a reflecting member 91 disposed forward of the LED light emitting element 90 in its light illumination direction. The reflecting member 91 can include a reflecting surface 95 configured to face to the light emission surface 92 of the LED light emitting element 90 and having a center axis 96. The reflecting surface 95 can be composed of an apex 93 projecting toward the light emission surface 92 of the LED light emitting element 90, and a curved conical reflecting surface 94 that is a side surface extending from the apex 93 and curved while being concave toward the center axis 96.

With this configuration, the light emitted from the LED light emitting element 90 can be radially reflected sideward and obliquely rearward with respect to the light illumination direction by means of the curved conical reflecting surface 94 of the reflecting member 91. Then the curved conical reflecting surface 94 can form a pseud light source (E) by the reflected light (F) therefrom. According to the conventional light source device disclosed in the conventional art, the light emission direction of light from the pseud light source (E) can be substantially the same as the light emission direction of light from a halogen bulb light source with a filament. Consequently, the formed position and the size of the light emission region of the pseud light source (E) can be the same as those of such a halogen bulb.

Referring back to FIG. 1, the bulb-type lamp 88 of Japanese Patent Application Laid-Open No. 2011-146253 includes a plurality of the LED elements 85 disposed on the support member 81 in a scattered manner, and the LED elements 85 each can be considered as a point light source in an optical system. Accordingly, there arises a problem in which the optical system having a single focal point cannot accurately control the light distribution of the light emitted from any LED elements other than one LED element just disposed at the focal point of the optical system.

Furthermore, in the LED bulb disclosed in Japanese Patent No. 4689762, the light from the pseud light source (E) can be reflected by the curved conical reflecting surface 94, so that the reflected light (D) can form the light distribution pattern 97 as illustrated in (b) of FIG. 2 with a curved conical shape projected by the curved conical reflecting surface 94. The light emitted from the pseud light source (E) can thus form light distribution characteristics and luminance distribution different from those of light emitted from a coiled filament with a constant diameter.

In other words, the light distribution characteristics of the pseud light source (E) can correspond to those of a coiled filament (F) that is prepared by winding filament while gradually changing the winding diameter to form a curved conical shape. Therefore, the pseud light source (E) can emit light rays including first light rays emitted from first portions corresponding to those of filament wound with larger diameters and second light rays emitted from second portions corresponding to those of filament wound with smaller diameters. When such a pseud light source (E) is mounted within a lighting fixture having a light distribution control system, the first light rays from the first portions of the pseud light source (E) can be controlled to provide light distribution characteristics in such a manner that they are spread by the light distribution control system while the second light rays from the second portions thereof can be controlled to provide light distribution characteristics in such a manner that they are converged to a certain direction.

As a result, the lighting fixture with such a pseud light source (E) installed in position is difficult to obtain the same or similar light distribution characteristics as or to those of a conventional lighting fixture including a coiled filament with a constant diameter.

Furthermore, the reflecting member 91 having the curved conical reflecting surface 94 that can provide such a pseud light source (E) needs to be supported by a support, and such a support must be arranged in the vicinity of the reflecting member 91 due to the limited space within the lighting fixture. This, however, results in formation of a shadow by the support shielding the light emitted from the pseud light source (E).

SUMMARY

The presently disclosed subject matter was devised in view of these and other problems and features in association with the conventional art. According to an aspect of the presently disclosed subject matter, an illuminating device can include an LED element as a light emission source and be capable of possessing the same light distribution characteristics as those of a common bulb having a coiled filament as a light emission source, and accordingly, of being used in place of such a common bulb.

According to another aspect of the presently disclosed subject matter, an illuminating device can include a light emitting element having an optical axis and a reflecting member disposed in front of the light emitting element. The reflecting member can be configured to include a first reflecting surface being a concave reflecting surface recessed forward. The first reflecting surface can be configured to include a first focal point disposed at or near the light emitting element and a second focal point disposed on the optical axis of the light emitting element and between the first focal point and the reflecting member. The illuminating device can be configured such that light rays emitted from the light emitting element can be reflected by the first reflecting surface to be converged to the second focal point and then be diffused to travel rearward.

According to another aspect of the presently disclosed subject matter, the illuminating device according to the previous aspect can be configured such that the reflecting member can be configured to include a second reflecting surface having a substantially conical face shape with an apex at an intersection between the optical axis and the reflecting member and a conical side wall with an increased diameter as the conical side wall extends toward the light emitting element. The second reflecting surface can be configured to be a convex reflecting surface projected rearward, and the first reflecting surface can be formed outside of the second reflecting surface.

According to another aspect of the presently disclosed subject matter, the illuminating device according to the previous aspect can be configured such that the reflecting member can be configured to include a third reflecting surface having a substantially inverted conical face shape inclined in the illumination direction of the light emitting element and linearly away from the optical axis. The third reflecting surface can be formed on the outer side in the radial direction than the first reflecting surface.

According to another aspect of the presently disclosed subject matter, the illuminating device according to the previous aspect can be configured to further include a light-shielding member configured to surround the light emitting element in a region from its sideward area to its obliquely sideward area.

According to another aspect of the presently disclosed subject matter, the illuminating device according to the previous aspect can be configured such that the first reflecting surface can be formed in a first region corresponding to a first solid angle where approximately 30% of the light rays emitted from the light emitting element can pass, the second reflecting surface can be formed in a second region corresponding to a second solid angle where approximately 10% of the light rays emitted from the light emitting element can pass, and the third reflecting surface can be formed in a third region corresponding to a third solid angle where approximately 20% of the light rays emitted from the light emitting element can pass.

The illuminating device made in accordance with principles of the presently disclosed subject matter can provide illumination characteristics similar to those provided by a conventional general bulb filament.

In the illuminating device of the presently disclosed subject matter, a first pseud point light source can be formed by the second reflecting surface while a second pseud point light source can be formed at the second focal point. Therefore, assume a case where the second pseud point light source or the two pseud light sources including the first and second pseud point light sources of the illuminating device can be set to a position or positions encompassed by a conventional bulb filament. In this case, even when the light emitting element of an LED serving as a point light source is used, the light rays can be emitted as if they are emitted from both the first and second pseud point light sources. Furthermore, the light rays from the pseud point light sources can travel in optical paths formed by the optical system. Therefore, the light rays can pass through the same optical paths as those for a conventional bulb filament 60, through which light rays emitted from the conventional bulb filament 60 at the position corresponding to the second pseud point light source or the positions corresponding to the two pseud point light sources of the first and second pseud point light sources can pass.

Therefore, the illuminating device 1 can emit the light rays with the same or similar light distribution characteristics as or to those of the conventional bulb filament 60 with a length encompassing the second pseud point light source or two pseud point light sources including the first and second pseud point light sources. Accordingly, such a conventional bulb using a filament with the length corresponding to the second pseud point light source or the distance between two pseud point light sources including the first and second pseud point light sources can be replaced with the illuminating device.

According to still another aspect of the presently disclosed subject matter, a lighting fixture can be configured to include: a housing configured to include a complex reflecting surface constituted by a plurality of reflecting surfaces; and the illuminating device according to any one of the above-described aspects.

With this configuration, the above-mentioned advantageous effects can also be obtained.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

Figure 1:
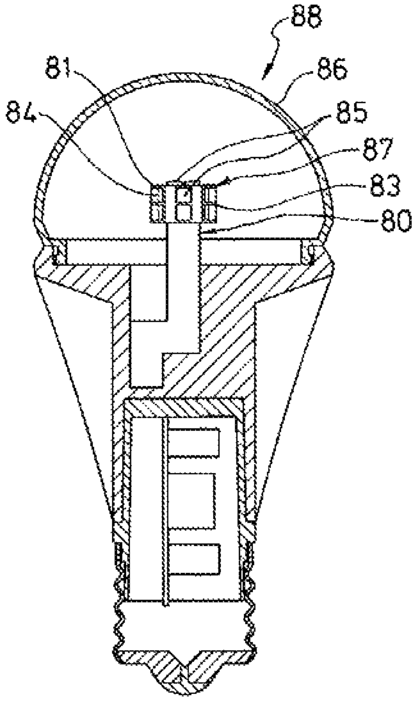
FIG. 1 Conventional Art
FIG. 1 is a cross-sectional view of a bulb-type lamp as a conventional example.
Figure 2:
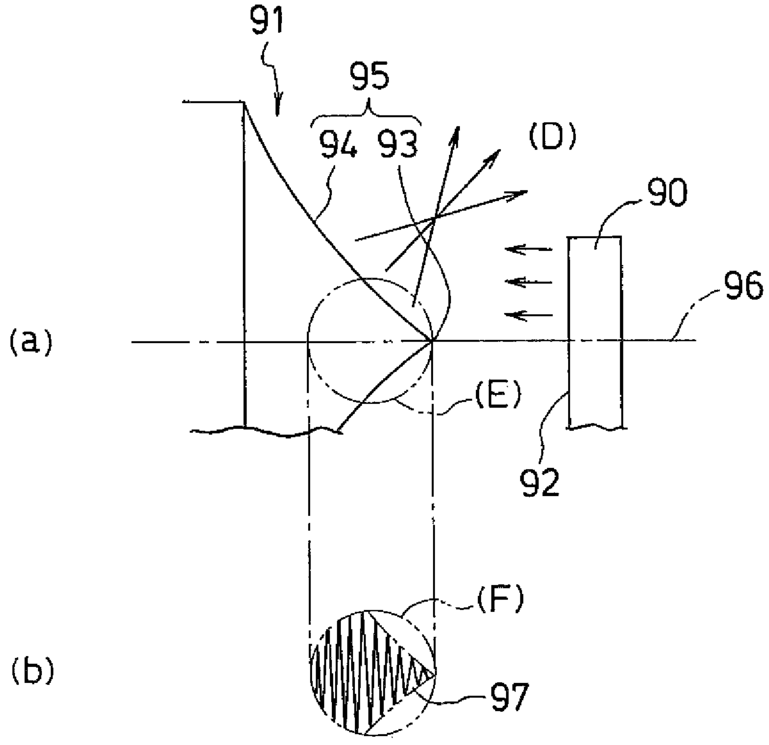
FIG. 2 Conventional Art
FIG. 2 is a schematic view of an LED bulb as another conventional example, including (a) a partial enlarged view of an essential part of the LED bulb and (b) a schematic view of a light distribution pattern obtained by the LED bulb of (a)

A description will now be made below to an illumination device and a lighting fixture using the same made in accordance with the principles of the presently disclosed subject matter with reference to the accompanying drawings in accordance with exemplary embodiments.

In the description, the main light emission direction of a light source used in the illuminating device is defined as a forward direction or upper direction depending on the drawing unless otherwise specified.

Figure 3:
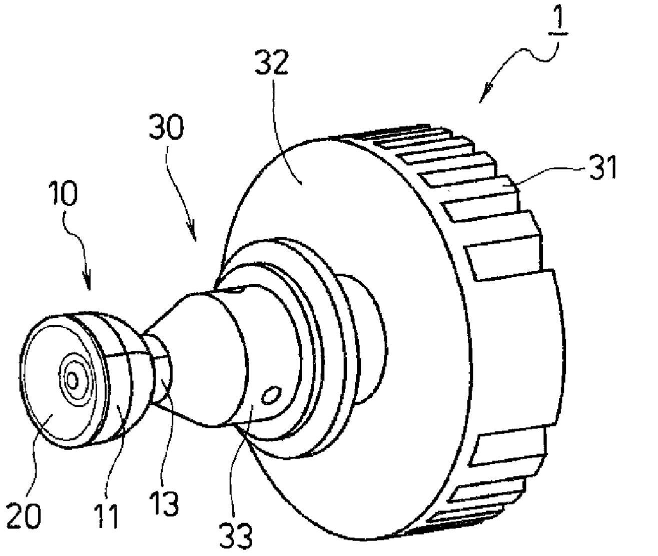
FIG. 3 is a perspective view illustrating an illuminating device made in accordance with principles of the presently disclosed subject matter.
Figure 4:
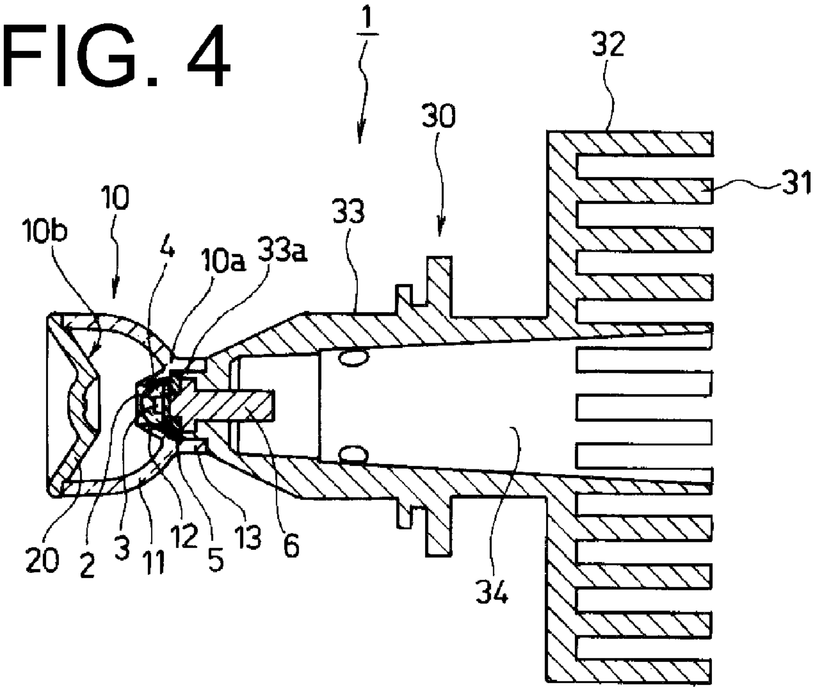
FIG. 4 is a horizontal cross-sectional view of the illuminating device of FIG. 3.

FIG. 3 is a perspective view illustrating an illuminating device made in accordance with principles of the presently disclosed subject matter when viewed from obliquely upper direction, and FIG. 4 is a horizontal cross-sectional view of the illuminating device of FIG. 3.

The illuminating device 1 can include an LED 2 as a light source mounted on an LED mounting substrate 5, an optical path control cover member 10 or simply cover member, an optical path control member 20, and a main body 30. The cover member 10 can control the optical path of the light emitted from the LED 2. The main body 30 can include a heat dissipation function portion for dissipating heat generated by the LED 2 and disposed on its rear side.

Specifically, the main body 30 can have a heat sink 32 as the heat dissipation function portion having a plurality of heat dissipation fins 31, and a support portion 33 erected forward from the center of the heat sink 32 and extending, for example, in the illumination direction of the LED 2 to have a cylindrical tip end portion 33*a*. The heat sink 32 and the support portion 33 can include a through hole 34 passing therethrough in the extending direction of the support portion 33 at its center. The through hole 34 can serve as a wiring path for enclosing a powering member for supplying power to the LED 2.

The optical path control cover member 10 can be formed from a transparent member and have an opening with a circular opening edge 10*a* at one end thereof. The optical path control cover member 10 can include a side wall portion 11, a light-shielding portion or shade 12, and an outer fitted portion 13. The side wall portion 11 can be configured to extend forward (in the main illumination direction of the LED 2) from the circular opening edge 10*a* and be opened outward in a ring shape to have a circular opening 10*b* at the other end. The shade 12 can be configured to extend forward from the circular opening edge 10*a* inward of the side wall portion 11 in a ring wall shape shorter than the side wall portion 11. The outer fitted portion 13 can be configured to extend rearward (in a direction opposite to the direction in which the side wall portion 11 and the shade 12 extend) from the circular opening edge 10*a* in a cylindrical shape. The optical path control member 20 can be attached to the circular opening 10*b* of the side wall portion 11 to close the opening 10*b*.

The outer fitted portion 13 of the optical path control cover member 10 can be fitted from outside to the cylindrical tip end portion 33*a* of the support portion 33 so that the support portion 33 can hold the optical path control cover member 10. A metal substrate supporting member 6 can be inserted into and fitted to the tip end portion of the through hole 34 so as to support the LED mounting substrate 5 on which the LED 2 is mounted.

The LED 2 can include an LED element 3 and a phosphor-containing resin 4 in which a phosphor is dispersed in a transparent resin. The phosphor-containing resin 4 can seal the LED element 3 in a spherical or aspherical shape. The LED 2 can be disposed at the tip end portion of the support portion 33 and projected through the opening of the optical path control cover member 10, so that the LED 2 can be surrounded by the shade 12 in a region from its side to its obliquely upper side. Therefore, the optical path control member 20 attached to the optical path control cover member 10 can be located in front of the LED 2 in the main illuminating direction of the LED 2.

Figure 5:
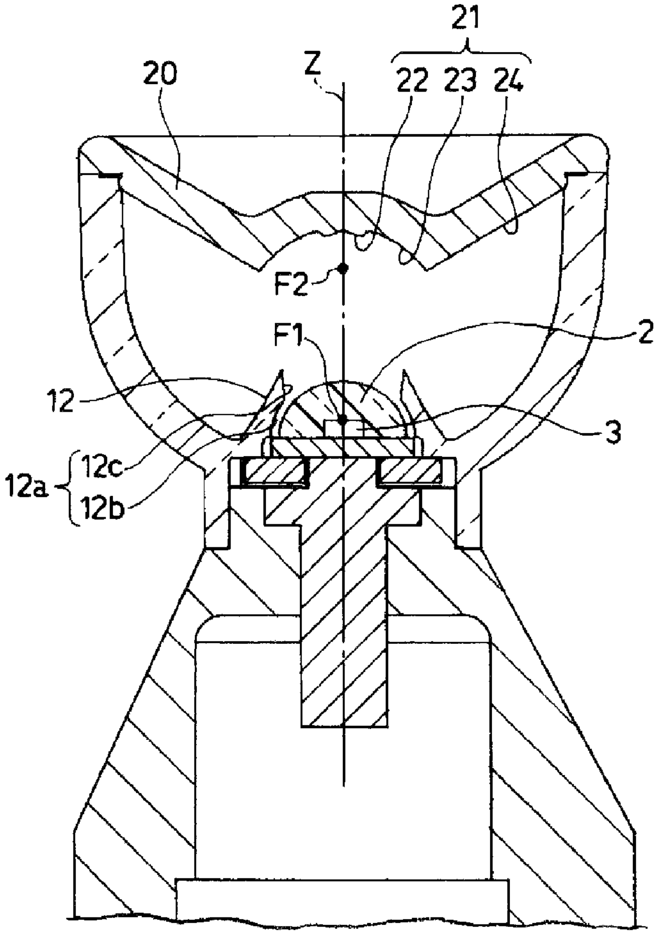
FIG. 5 is an enlarged cross-sectional view of the illuminating device of FIG. 4.

A description will now be given of the optical relationship among the light rays emitted from the LED 2, the light shielding member or shade 12, and the optical path control member 20 with reference to FIG. 5, which is an enlarged cross-sectional view of the illuminating device of FIG. 4.

The LED 2 can have directivity characteristics with a Lambertian distribution. The shade 12 can shield the light rays emitted from the LED 2 at its side and obliquely upper side so that about 60% of the light rays from the LED 2 can be directly projected onto the optical path control member 20.

The inner face of the shade 12 facing to the LED 2 can be a mirror reflecting surface 12*a*. Specifically, the mirror reflecting surface 12*a* can include a ring-shaped curved reflecting surface 12*b* following the side face of the LED 2 to surround the LED 2, and a cylindrical reflecting surface 12*c* erected from the upper edge of the curved reflecting surface 12*b* as illustrated in FIG. 5.

The optical path control member 20 can include a metal mirror reflecting surface (or mirror reflecting surface) 21 receiving the 60% light rays from the LED 2 and composed of an aluminum deposition film. The mirror reflecting surface 21 can include a first mirror reflecting surface (or first reflecting surface) 23, a second mirror reflecting surface (or second reflecting surface) 22, and a third mirror reflecting surface (or third reflecting surface) 24. The second reflecting surface 22 can be formed in a circular region (second region) including an intersection between an optical axis Z of the LED 2 and the mirror reflecting surface 21 at its substantially center region. The first reflecting surface 23 can be formed in a ring-shaped region (first region) outside of the second reflecting surface 22 to surround the second reflecting surface 22. The third reflecting surface 24 can be formed in an outermost ring-shaped region (third region) outside of the first reflecting surface 23 to surround the first reflecting surface 23.

Figure 6:
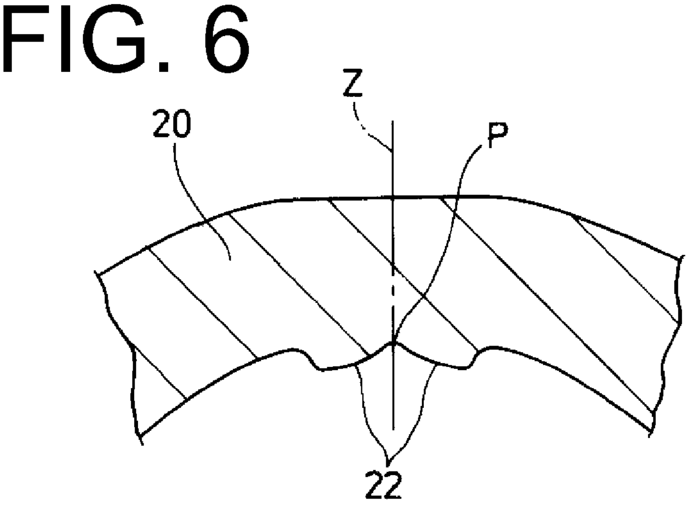
FIG. 6 is an enlarged partial cross-sectional view illustrating a second reflecting surface of the illuminating device.

Specifically, the second reflecting surface 22 can be formed in the second region where approximately 10% of the light rays emitted from the LED 2 can be projected, or the second region corresponding to a second solid angle where approximately 10% of the light rays emitted from the LED 2 can pass. FIG. 6 is an enlarged partial cross-sectional view illustrating the second reflecting surface 22. As illustrated, the second reflecting surface 22 can be formed in a substantially conical face shape with an apex at the intersection between the optical axis Z and the reflecting surface 21 and a conical side wall with an increased diameter toward the LED 2. Furthermore, the second reflecting surface 22 can be recessed toward the light emitting direction of the LED 2 while be bulged inward (projected rearward). The second region of the second reflecting surface 22 can receive approximately 10% of the light rays emitted from the LED 2. Furthermore, since the LED 2 can have the directivity characteristics with the Lambertian distribution, the size of the second region is remarkably smaller than the first and third regions of the first and third reflecting surfaces 23 and 24. Accordingly, it can be said that the substantially conical face of the second reflecting surface 22 is constituted by an extremely small convex reflecting surface.

Referring to FIG. 5 again, the first reflecting surface 23 disposed outside of the second reflecting surface 22 can be formed in the first region where approximately 30% of the light rays emitted from the LED 2 can be projected, or the first region corresponding to a first solid angle where approximately 30% of the light rays emitted from the LED 2 can pass. The first reflecting surface 23 can be a concave reflecting surface recessed forward. The first reflecting surface 23 can be configured to have a first focal point F1 disposed at or near the light emitting element 3 of the LED 2 and a second focal point F2 disposed on the optical axis Z between the first focal point F1 and the intersection between the optical axis Z and the mirror reflecting surface 21.

The outermost third reflecting surface 24 disposed outside of the first reflecting surface 23 can be formed in the third region where approximately 20% of the light rays emitted from the LED 2 can be projected, or the third region corresponding to a third solid angle where approximately 20% of the light rays emitted from the LED 2 can pass. The third reflecting surface 24 can be a substantially inverted conical face shape inclined with respect to the illumination direction of the LED 2 and linearly away from the optical axis Z.

Figure 7:
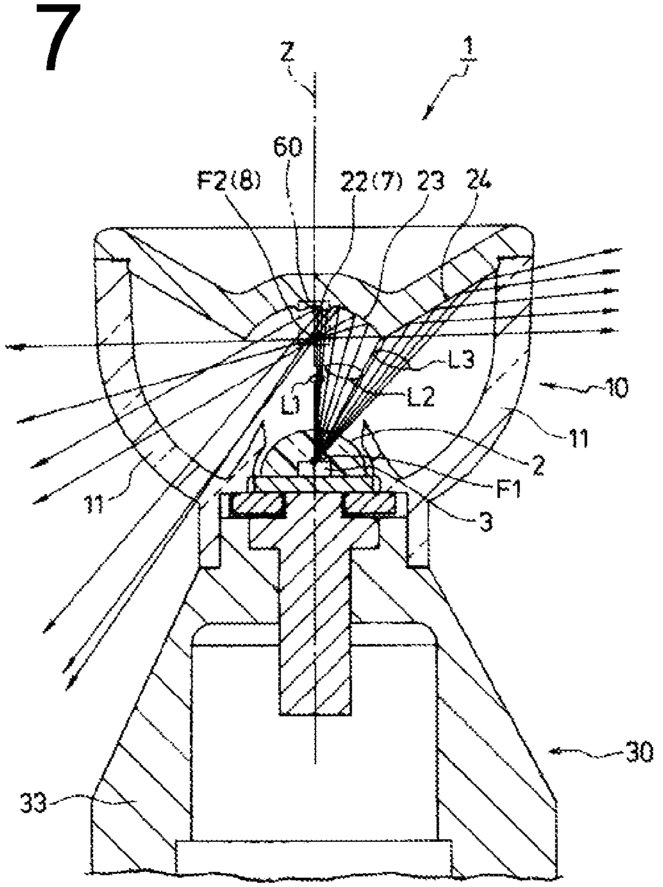
FIG. 7 is a horizontal cross-sectional view of the illuminating device, overlaid with a ray tracing diagram (optical paths)

A description will now be given of how the light rays travel with this optical system with reference to FIG. 7, which is a horizontal cross-sectional view of the illuminating device 1, overlaid with a ray tracing diagram (optical paths). When the LED 2 is turned on, the light rays L1 of approximately 10% of the total light rays emitted from the LED 2 and directed to the second reflecting surface 22 of the optical path control member 20 can be reflected by the extremely small convex reflecting surface of the second reflecting surface 22 to be directed obliquely rearward (in a direction opposite to the light emitting direction of the LED 2) through the side wall portion 11, so that the light rays L1 can travel straightforward without hindrance by the main body 30 (in particular, the support portion 33 of the main body 30). Therefore, the extremely small convex reflecting surface of the second reflecting surface 22 can have such a shape and disposed at such a position that the light rays L1 reflected by the extremely small convex reflecting surface are not hindered by the main body 30.

In this case, the extremely small convex reflecting surface of the second reflecting surface 22 can receive the light rays L1 emitted from the point light source or the LED element 3 of the LED 2. Therefore, the reflected light by the second reflecting surface 22 can be considered as a first pseud point light source 7 in terms of optical system as if light rays are emitted from a light source disposed at the position of the second reflecting surface 22.

Furthermore, when the LED 2 is turned on, the light rays L2 of approximately 30% of the total light rays emitted from the LED 2 and directed to the first reflecting surface 23 of the optical path control member 20 can be reflected by the concave reflecting surface of the first reflecting surface 23 to be converged at the second focal point F2 and then diffused to travel obliquely rearward and sideward through the side wall portion 11, so that the light rays L2 can travel straightforward without hindrance by the main body 30 (in particular, the support portion 33 of the main body 30). Therefore, the concave reflecting surface of the first reflecting surface 23 can have such a shape and disposed at such a position that the light rays L2 reflected by the concave reflecting surface are not hindered by the main body 30.

In this case, the reflected light by the first reflecting surface 23 and converged at the second focal point F2 can be considered as a second pseud point light source 8 in terms of optical system as if light rays are emitted from a light source disposed at the position of the second focal point F2.

Furthermore, when the LED 2 is turned on, the light rays L3 of approximately 20% of the total light rays emitted from the LED 2 and directed to the third reflecting surface 24 of the optical path control member 20 can be reflected by the inverted conical reflecting surface of the third reflecting surface 24 to be directed sideward and obliquely forward through the side wall portion 11, so that the light rays L3 can travel straightforward.

Therefore, assume a case where the two pseud light sources including the first and second pseud point light sources 7 and 8 of the illuminating device 1 can be set to a position or positions encompassed by a conventional bulb filament 60. In this case, even when the light emitting element 3 of the LED 2 serving as a point light source is used, the light rays L1 and L2 can be emitted as if they are emitted from both the first and second pseud point light sources 7 and 8. Furthermore, the light rays L1 and L2 from the pseud point light sources 7 and 8 can travel in optical paths specifically formed by the optical system. Therefore, the light rays L1 and L2 can pass through the same optical paths as those for the conventional bulb filament 60, through which light rays emitted from the conventional bulb filament 60 at the positions corresponding to the two pseud point light sources of the first and second pseud point light sources can pass.

Therefore, the illuminating device 1 can emit the light rays with the same or similar light distribution characteristics as or to those of the conventional bulb filament 60 with a length encompassing the two pseud point light sources including the first and second pseud point light sources 7 and 8. Accordingly, such a conventional bulb using a filament with the length corresponding to the distance between the first and second pseud point light sources 7 and 8 can be replaced with the illuminating device 1 having the first and second pseud point light sources 7 and 8 between which the distance is appropriately controlled.

It should be noted that even when only the second pseud light source 8 is disposed at a position encompassed by a conventional bulb filament 60, specifically, even when only the light rays reflected by the first reflecting surface 23 are used, the light rays L2 can be emitted and travel in optical paths formed by the optical system as if they are emitted from the second pseud point light source 8. Also in this case, the light rays L2 can pass through the same optical paths as those for the conventional bulb filament 60, through which light rays emitted from the conventional bulb filament 60 at the position corresponding to the second pseud point light source can pass. Therefore, such a conventional bulb using a filament can be replaced with the illuminating device 1 having the above-described configuration.

Incidentally, the LED element 3 can emit heat while emitting light. The LED mounting substrate 5 on which the LED 2 is mounted can be supported by the substrate support member 6 inserted into and fitted to the through hole 34 of the main body 30. As illustrated in FIG. 4, the generated heat by the LED element 3 can be conducted through the LED mounting substrate 5, the heat-conductive substrate supporting member 6, and the support portion 33 of the main body 30 into the heat sink 32, where the heat can be effectively dissipated through the heat dissipation fins 31 of the heat sink 32.

Therefore, the self-heat dissipation of the device can be efficiently achieved to prevent the temperature increase of the LED element 3 itself. Accordingly, the decrease in light emission efficiency of the LED element 3 due to temperature increase can be prevented, and the decrease in the amount of light emission from the LED element 3 due to the decreased light emission efficiency can also be prevented. Similarly, the shortened durable life of the LED element 3 due to temperature increase can be prevented. Thus, the illuminating device 1 according to the presently disclosed subject matter can emit light with high reliability and with an appropriate amount of emission light for a long period of time.

Next, a description will be given of a lighting fixture 50 utilizing the illuminating device 1 with the above-mentioned configuration.

Figure 8:
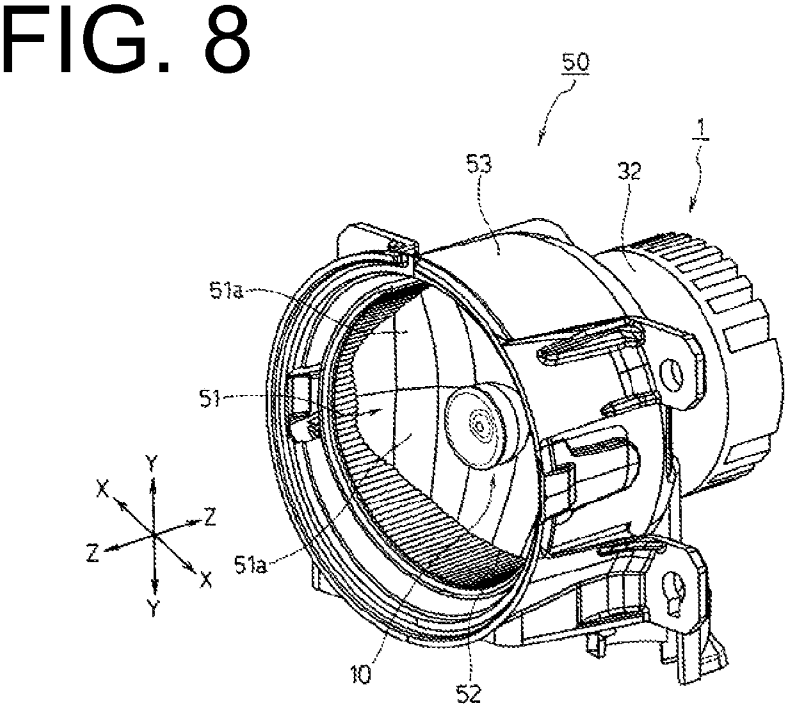
FIG. 8 is a perspective view of a lighting fixture using the illuminating device as a light source.

FIG. 8 is a perspective view of a lighting fixture 50 using the illuminating device 1 as a light source. Specifically, the lighting fixture 50 can include a housing 53 and the illuminating device 1 attached to the housing 53. The front-side parts including the optical path control cover member 10 held by the tip end portion 33*a* of the support portion 33 and the optical path control member 20 can be housed within the housing 53, and the heat sink 33 of the illuminating device 1 can be disposed outside of the housing 53.

The housing 53 can include a complex reflecting surface 51 composed of a plurality of reflecting surfaces 51*a*. The plurality of reflecting surfaces 51*a* can include those surrounding the optical path control cover member 10 in a region from its obliquely rearward side via its side to its obliquely forward side when viewed along a plane including X-X and Z-Z directions of the lighting fixture 50, and also those surrounding the optical path control cover member 10 in a region from its obliquely rearward side to its side when viewed along a plane including Y-Y and Z-Z directions of the lighting fixture 50.

Figure 9:
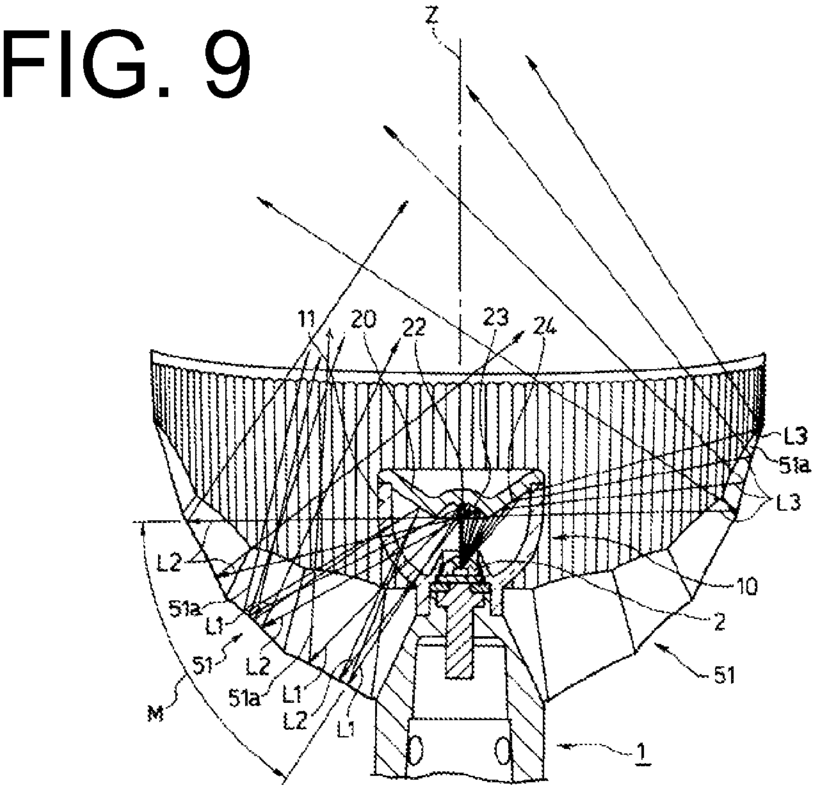
FIG. 9 is a cross-sectional view of the lighting fixture of FIG. 8, overlaid with a ray tracing diagram (optical paths).

With reference to FIG. 9 which is a cross-sectional view of the lighting fixture of FIG. 8, overlaid with a ray tracing diagram (optical paths), when the LED 2 of the illuminating device 1 is turned on, the light rays L1 emitted from the LED 2 toward the second reflecting surface 22 of the optical path control member 20 and reflected by the second reflecting surface 22 can be directed obliquely rearward to pass through the side wall portion 11. Then, the light rays L1 can be reflected by the respective reflecting surfaces 51*a* constituting the complex reflecting surface 51 in a region denoted by reference sign M in FIG. 9 to be directed to the optical axis Z or positions close to the optical axis Z.

Furthermore, the light rays L2 emitted from the LED 2 toward the first reflecting surface 23 of the optical path control member 20 and reflected by the first reflecting surface 23 can be converged at the second focal point F2 and then diffused to travel obliquely rearward and sideward through the side wall portion 11. Then, the light rays L2 can be reflected by the respective reflecting surfaces 51*a* constituting the complex reflecting surface 51 in the region denoted by reference sign M in FIG. 9 to be directed to the optical axis Z or positions close to the optical axis Z.

Furthermore, the light rays L3 emitted from the LED 2 toward the third reflecting surface 24 of the optical path control member 20 and reflected by the third reflecting surface 24 can be directed sideward and obliquely forward through the side wall portion 11. Then, the light rays L3 can be reflected by the respective reflecting surfaces 51*a* constituting the complex reflecting surface 51 to be directed to wider regions with respect to the optical axis Z.

As described above, the light rays L1 considered as light rays emitted from the first pseud point light source 7 (see FIG. 7) and the light rays L2 considered as light rays emitted from the second pseud point light source 8 (see FIG. 7) among the light rays L1 to L3 directed to the complex reflecting surface 51 can each have regularity in the illuminating direction. Therefore, the shapes of the respective reflecting surfaces 51*a* constituting the complex reflecting surface 51 can be simplified, thereby decreasing the process steps for optical design of the complex reflecting surface 51 and for designing and manufacturing a mold for molding that part. Furthermore, the resulting complex reflecting surface 51 can properly reproduce the designed optical characteristics.

The illuminating device 1 can be designed to provide specific light distribution patterns by the light rays L1, L2, and L3 when the illuminating device 1 is used in a vehicle lighting unit with a specific optical system. Specifically, the illuminating device 1 can be configured such that the light rays L1 and L2 can form a main light distribution pattern formed by the complex reflecting surface 51 in front of the lighting fixture and that the light rays L3 can form a subsidiary light distribution pattern formed by the complex reflecting surface 51 in a road shoulder area. With this configuration, the vehicle lighting fixture utilizing the illuminating device 1 of the presently disclosed subject matter with excellent light distribution properties can be achieved with high production value.

Incidentally, the light rays emitted from the LED 2 sideward and obliquely sideward can be shielded by the light shielding member or shade 12, so that approximately 40% of the light rays do not contribute to the illumination. This is because the light rays emitted sideward and obliquely sideward from the light emission surface of the LED element 3 can travel through the phosphor-containing resin 4 with a longer distance than the light rays emitted forward and obliquely forward from the light emission surface of the LED element 3. Thus, the light rays travelling with a longer distance can be wavelength-converted more, and the resulting light rays can be light rays with a different hue with a higher ratio of the wavelength converted light rays by the phosphor. Accordingly, the use of the wavelength converted light rays in a much amount may deteriorate the color uniformity.

For example, when the LED element 3 can emit blue light (use of blue LED) and the phosphor dispersed in the phosphor-containing resin 4 can be excited by the blue light to emit yellow light (use of yellow phosphor), the emitted light rays sideward and obliquely sideward may become more yellowish than the light rays emitted forward and obliquely forward. Thus, the yellowish light rays can be shielded by the light shielding member or shade 12.

Incidentally, the side wall portion 11 of the optical path control cover member 10 can be a part that is not involved in the optical path control of the illuminating device 1, but is provided for supporting the optical path control member 20 in place such that the mirror reflecting surface 21 can be properly located and face to the LED 2. Thus, the side wall portion 11 may be removed if there is another holding member for maintaining the positional relationship between the LED 2 and the mirror reflecting surface 21 of the optical path control member 20 without affecting the optical path formation.

The mirror reflecting surface 21 of the optical path control member 20 is not necessarily be a metal mirror reflecting surface of an aluminum deposition film, but may be formed by polishing a metal material for constituting the optical path control member 20 to form a mirror reflecting surface on the optical path control member 20.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. An illuminating device comprising:

a light emitting element having an optical axis; and a reflecting member disposed in front of the light emitting element, wherein the reflecting member includes a first reflecting surface being a concave reflecting surface recessed forward, the first reflecting surface includes a first focal point disposed at or near the light emitting element and a second focal point disposed on the optical axis of the light emitting element and between the first focal point and the reflecting member, and the illuminating device is configured such that light rays emitted from the light emitting element are reflected by the first reflecting surface to be converged to the second focal point and then be diverged to travel rearward.

2. The illuminating device according to claim 1, wherein the reflecting member includes a second reflecting surface having a substantially conical face shape with an apex at an intersection between the optical axis and the reflecting member and a conical side wall with an increased diameter as the conical side wall extends toward the light emitting element, the second reflecting surface is a convex reflecting surface projected rearward, and the first reflecting surface is formed outside of the second reflecting surface.

3. The illuminating device according to claim 2, wherein the reflecting member includes a third reflecting surface having a substantially inverted conical face shape inclined in the illumination direction of the light emitting element and linearly away from the optical axis, and the third reflecting surface is formed on the outer side in a radial direction than the first reflecting surface.

4. The illuminating device according to claim 3, further comprising a light-shielding member surrounding the light emitting element in a region from its sideward area to its obliquely sideward area.

5. The illuminating device according to claim 4, wherein the first reflecting surface is formed in a first region corresponding to a first solid angle where approximately 30% of the light rays emitted from the light emitting element can pass, the second reflecting surface is formed in a second region corresponding to a second solid angle where approximately 10% of the light rays emitted from the light emitting element can pass, and the third reflecting surface is formed in a third region corresponding to a third solid angle where approximately 20% of the light rays emitted from the light emitting element can pass.

6. A lighting fixture comprising:

a housing configured to include a complex reflecting surface constituted by a plurality of reflecting surfaces; and an illuminating device disposed within the housing and including a light emitting element having an optical axis and a reflecting member disposed in front of the light emitting element, wherein the reflecting member includes a first reflecting surface being a concave reflecting surface recessed forward, the first reflecting surface includes a first focal point disposed at or near the light emitting element and a second focal point disposed on the optical axis of the light emitting element and between the first focal point and the reflecting member, the illuminating device is configured such that light rays emitted from the light emitting element are reflected by the first reflecting surface to be converged to the second focal point and then be diverged to travel rearward, and the diverged light rays travelling rearward are reflected by the plurality of reflecting surfaces of the complex reflecting surface of the housing forward.

7. The lighting fixture according to claim 6, wherein the reflecting member includes a second reflecting surface having a substantially conical face shape with an apex at an intersection between the optical axis and the reflecting member and a conical side wall with an increased diameter as the conical side wall extends toward the light emitting element, the second reflecting surface is a convex reflecting surface projected rearward, the first reflecting surface is formed outside of the second reflecting surface, and the light rays reflected by the second reflecting surface and travelling obliquely rearward are reflected by the plurality of reflecting surfaces of the complex reflecting surface of the housing forward.

8. The lighting fixture according to claim 7, wherein the reflecting member includes a third reflecting surface having a substantially inverted conical face shape inclined in the illumination direction of the light emitting element and linearly away from the optical axis, the third reflecting surface is formed on the outer side in a radial direction than the first reflecting surface, and the light rays reflected by the third reflecting surface and travelling sideward and obliquely forward are reflected by the plurality of reflecting surfaces of the complex reflecting surface of the housing forward.

9. The lighting fixture according to claim 8, wherein the illuminating device further includes a light-shielding member surrounding the light emitting element in a region from its sideward area to its obliquely sideward area.

10. The lighting fixture device according to claim 9, wherein the first reflecting surface is formed in a first region corresponding to a first solid angle where approximately 30% of the light rays emitted from the light emitting element can pass, the second reflecting surface is formed in a second region corresponding to a second solid angle where approximately 10% of the light rays emitted from the light emitting element can pass, and the third reflecting surface is formed in a third region corresponding to a third solid angle where approximately 20% of the light rays emitted from the light emitting element can pass.

* * * * *